Aug. 10, 1943.  R. L. KUEHN  2,326,541
MACHINE TOOL
Filed Dec. 16, 1940  3 Sheets-Sheet 1
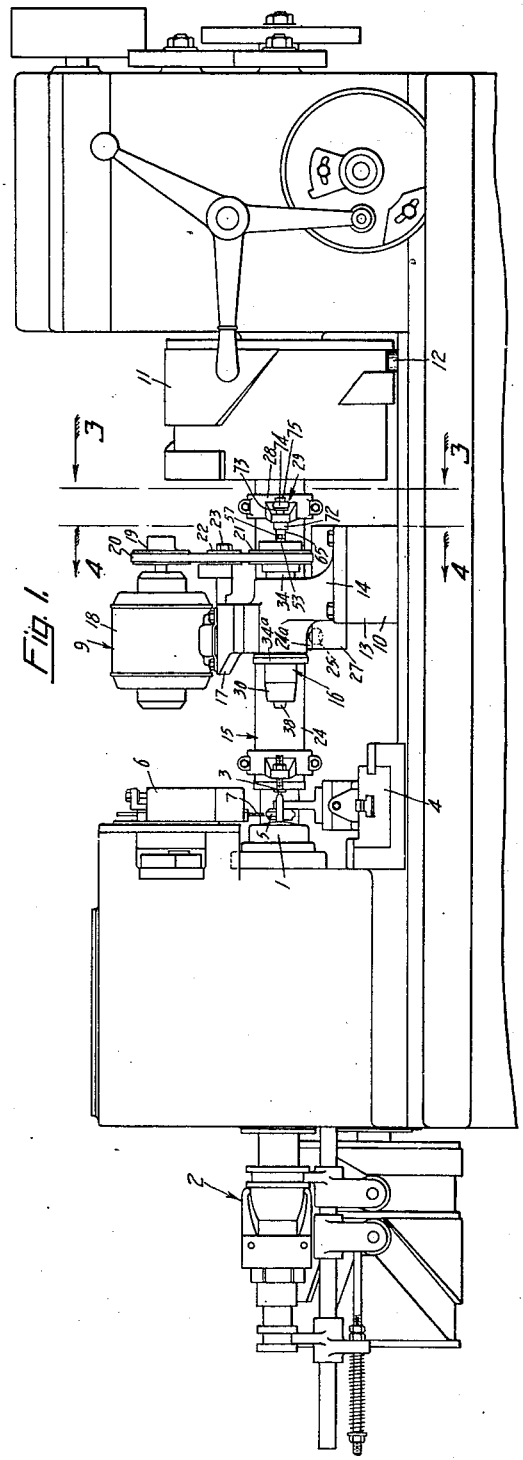
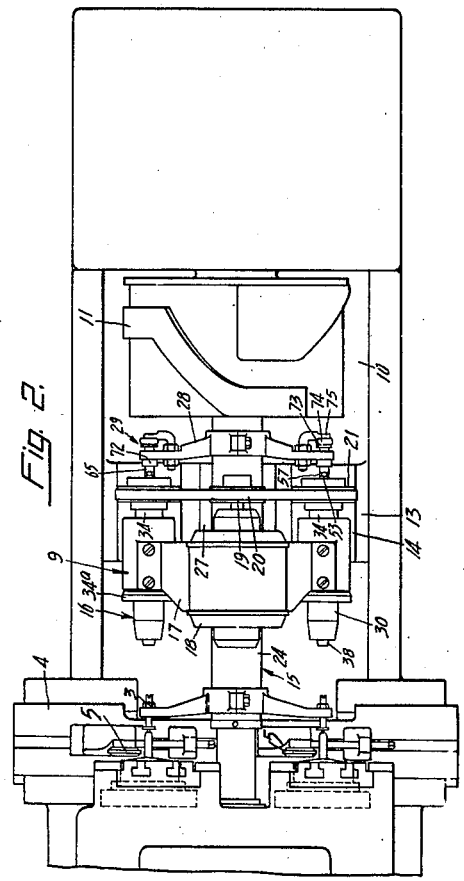
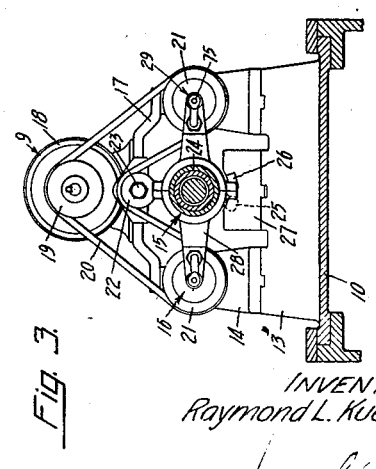
INVENTOR
Raymond L. Kuehn
ATTORNEY

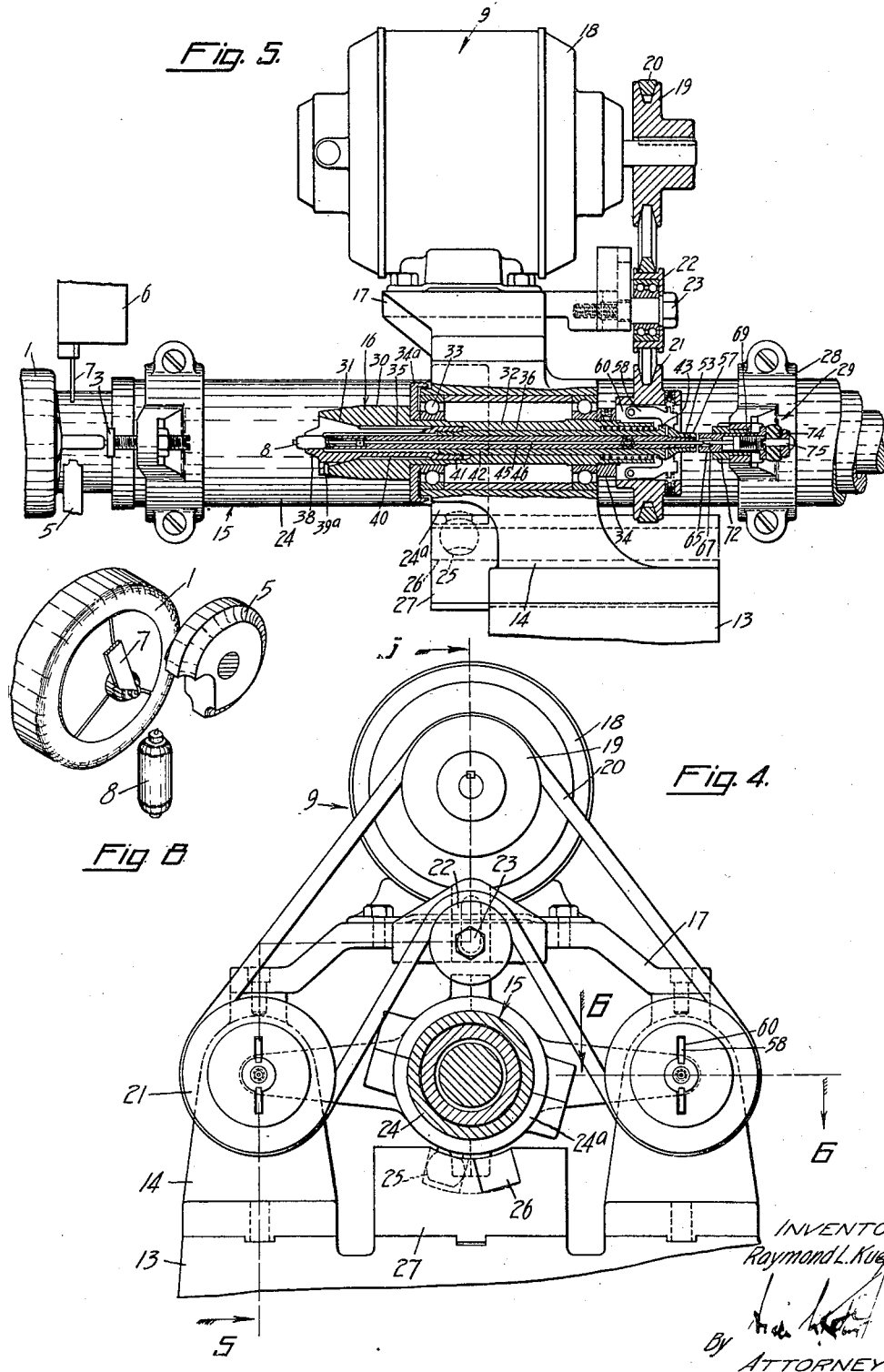

Aug. 10, 1943.  R. L. KUEHN  2,326,541
MACHINE TOOL
Filed Dec. 16, 1940  3 Sheets-Sheet 3
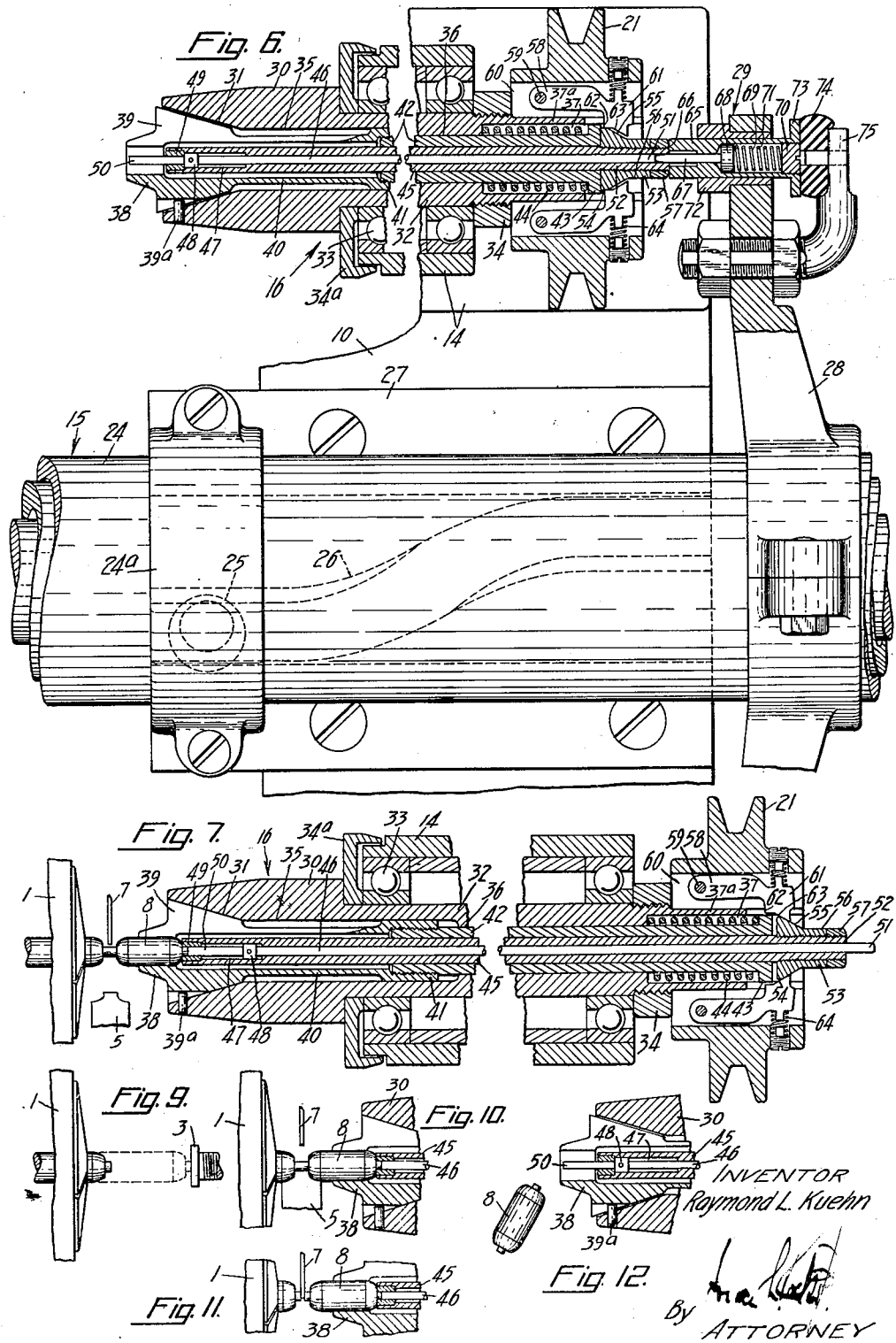

Patented Aug. 10, 1943

2,326,541

UNITED STATES PATENT OFFICE 2,326,541

MACHINE TOOL

Raymond L. Kuehn, Hartford, Conn., assignor to The Billings & Spencer Company, a corporation of Connecticut Application December 16, 1940, Serial No. 370,342

21 Claims. (Cl. 29—37)

This invention relates to machine tools.

It has among its objects to provide an improved machine tool of the so-called two-at-a-time type described and claimed in the Kelly Patent No. 2,201,182, patented May 21, 1940, whereby it is made possible to extend the use of such machines to those uses, such, for example, as the making of roller bearings, wherein it is important for the pieces to be free from the burrs produced by the breaking off of the same during cutting and before completion of the cutting off operation. A further object of this invention is to provide such an improved machine wherein the pieces during the cutting off operation are grasped at their extremities by work rotating means rotating synchronously with the work spindles, so that these pieces are severed cleanly from the stock by the cutting off tools, and subsequently withdrawn and ejected, all through improved mechanism cooperating in the desired sequence with the remainder of the mechanism of such a machine. A still further object of this invention is to provide an improved attachment for such machines whereby the same may be adapted to such work and including improved piece gripping, rotating, and ejecting mechanism controlled in an improved manner and adapted to be readily applied to an existing machine of standard construction. These and other objects and advantages of this improved construction will, however, hereinafter more fully appear.

In the accompanying drawings, one form which the invention may assume in practice is shown for purposes of illustration.

In these drawings:

Figure 1 is a side elevation of a machine equipped with these improvements, the improved mechanism being shown in its empty retracted position wherein it is ready to move forward on its longitudinal carrier to grip new pieces before the next cutting off operation;

Fig. 2 is a top plan view of a portion of the machine, the work rotating and feeding mechanism thereof being broken away and the cutting off mechanism being omitted to facilitate illustration;

Fig. 3 is a section on line 3—3 of Figure 1;

Fig. 4 is an enlarged view generally similar to Figure 3 and partially in section on line 4—4 of Figure 1;

Fig. 5 is a sectional view on lines 5—5 of Figure 3, the parts being shown in the position which they occupy while moving rearward after the cutting off operation and as they approach piece ejecting position;

Fig. 6 is an enlarged section on line 6—6 of Figure 4 showing the work holding mechanism in the position shown in Figure 2, together with its supports, portions of the work holding mechanism being broken away to facilitate illustration;

Fig. 7 is a detail of the work holder mechanism showing the parts thereof in the position occupied during the cutting off operation;

Fig. 8 is a detail perspective view showing the cutting off operation and the burr previously formed thereby as the cut off piece breaks off during the cutting off operation;

Fig. 9 is a simplified diagrammatic view showing the stock in full lines following the cutting off operation and in dotted lines as moved forward into engagement with the stock stop;

Fig. 10 is a detail view showing the parts during the forming operation;

Fig. 11 is a like view showing the parts during the cutting off operation, and

Fig. 12 is a like view showing the finished piece in process of ejection.

The machine shown in this illustrative embodiment includes a plurality of horizontal work spindles 1 arranged parallel to one another and operated through usual stock rotating and feeding mechanism including usual feeding mechanism 2, to advance the stock against usual swinging stock stops 3, while a usual transversely movable slide mechanism 4 carrying forming tools 5 is provided and usual cut off mechanism including vertical cut off slides 6 carrying cut off tools 7 is also provided, so that after the stock has engaged the stock stops, these tools are successively presented to the work, as shown in Figures 10 and 11 in a well known manner, herein to form bearing rollers 8; the present invention being directed to improved work gripping, rotating, and ejecting mechanism operating in timed relation with the above described mechanisms and generally indicated at 9.

Herein this improved mechanism is carried on a longitudinally reciprocable carrier 10, heretofore constituting the longitudinal tool carrier, disposed opposite the working ends of the spindles 1 and on the opposite side thereof from the stock stops 3 and operated by the usual main actuating cam 11 through a roller 12 to move the carrier 10 toward and from the work in a well-known manner after an initial forming operation and before the cutting off operation. Here, however, wherein the slide 10 carries the improved work gripping, rotating, and ejecting mechanism 9, it will be noted that the carrier 10 moves forward into such position as to enable the latter to grip the work during the operation of the forming tools 5 and moves backward after the work has been cut off by the cutting off tools 7.

Herein the work gripping, rotating, and ejecting mechanism is provided in the form of an attachment adapted to be placed on the usual standard 13 provided on the carrier 10, in such manner as to enable a standard carrier to be used with a minimum of change. As shown, it also includes upstanding brackets 14 suitably fixed to the opposite ends of the standard 13 and projecting upward on opposite sides of the coaxial shafting, generally indicated at 15, which actuates the usual mechanism, not shown, for rotating the spindles 1 and operating the stock feeding mechanism 2 and the transverse and vertical tool slides 4 and 6 in the desired sequence while also swinging the stock stop arms 3 into and out of their operative position shown in Figure 1. Herein, these brackets 14 are apertured near their upper ends to receive and provide bearings for the rotatable units comprising the work gripping and rotating jaws mechanisms and the controlling mechanisms thereon, these units being generally indicated at 16 and hereinafter more specifically described, while the brackets also have a transverse motor supporting bracket 17 supported on their tops and suitably fixed thereto and supporting a motor 18 centrally located above and having its axis parallel to the main shafting 15. It will also be observed that this motor has a pulley 19 and a V-belt 20 extending around the pulley 19 and pulleys 21 on the rear ends of the mechanisms 16 while also passing over a suitable vertically adjustable ball bearing mounted idler pulley 22 carried on a rearwardly projecting pin 23 on the bracket 17 above the main shafting 15, all as shown in Figures 3, 4 and 5. Attention is also directed to the fact that the outer sleeve 24 of the shafting 15 also carries a two-part clamp ring 24a, one part of which carries a usual roller 25 on the under side thereof disposed in a longitudinally extending and laterally curved slot 26 in a stationary portion 27 on the standard 13 between the brackets 14, in such manner as thereby to impart the desired reverse swinging movements to the stock stop arms 3 which swing the same into and out of the stock stopping position shown in Figure 1, in a usual manner. Here it will also be observed that this outer sleeve 24 also carries arms 28 aligned with stock stops 3 and carrying on their extremities controlling mechanisms, generally indicated at 29, cooperating with the controlling mechanisms reciprocable with the mechanisms 16, as hereinafter described; advantage here being taken of the fact that the movement of this sleeve 24 is always such as to cause the mechanisms 29 always to be in the desired operative relation with respect to the reciprocable mechanisms 16 mounted on the carrier 10 when the latter is retracted, all in such manner as to enable these controlling mechanisms 29 on these arms 28 to control improved ejecting mechanism embodied in the mechanisms 16, and hereinafter described. Thus, it will be noted that the work gripping, rotating, and ejecting mechanisms 16 herein are not only capable of being rotated continuously by the motor 18, but rotated thereby at the same speed that the stock is rotated by the work spindles 1, while the mechanisms 16 are also moved toward the work so that they may grip the same before cutting off and may move backward with the cut off pieces to cooperate with the controlling mechanism 29 which is always in a position to cooperate with them as they approach their backward limit of travel.

Referring more particularly to the mechanisms 16 comprising the work gripping and rotating jaw mechanism and their associated control mechanisms, it will be noted that each of these includes a longitudinally extendnig collet carrying member 30 having a conical mouth 31 in its end toward the work and a portion 32 of reduced external diameter journalled in suitable longitudinally spaced ball bearings 33 in the brackets 14, while these members 30 are located longitudinally with respect to these brackets by nuts 34 and collars 34a at opposite ends of the bearings 33. As shown, each of these members 30 is also provided with a bore 35 extending inward a short distance from the conical mouth 31, and also with a communicating bore 36 of smaller diameter intermediate the ends of the member 30, while an inner annular groove 37 is provided at the rear end of each member 30 extending rearward from the nut 34 within a reduced end 37a. Within each member 30, a collet 38 is disposed having usual spring jaws 39 movable longitudinally relative to keys 39a on the member 30 and each having a rear conical portion engaging the conical mouth 31; each of these collets herein also having an inner portion 40 of reduced external and internal diameter, and a further inner portion 41 having a free sliding fit in the portion 35 of the jaw carrying member 30. As shown, a longitudinally extending sleeve member 42 of substantially the same external diameter as the internal diameter of the sleeve member 32 of the member 30 is threaded to the portion 41 on each collet, and this sleeve member is provided at its rear end with an annular collar 43 providing an outer abutment for a coil spring 44 disposed in and abutting the end wall of the annular groove 37 in the member 30. A sleeve 45 is also longitudinally reciprocable in the sleeve member 42 and an ejector operating rod 46 is similarly mounted in the sleeve 45. As shown, the latter at its front end is provided with an enlargement 47 in its bore in which a collar 48 suitably fixed to the rod 46 is movable within limits established by one end of the enlargement 47 and a smaller sleeve 49 therein through which the forward extremity 50 of the rod may move into the projecting position shown in Figure 6, the other end 51 of the rod in this position then being disposed within the sleeve 45, as shown in that figure.

Cooperating with the several sleeves 42 and 45 and the rod 46, is also improved controlling mechanism therefor likewise comprised in the mechanisms 16 and carried on each member 30 and rotatable by each pulley 21. As shown, the rearward end of the sleeve 45 is also rearwardly extended beyond the collar 43, as shown at 52, Here it carries a reciprocable cam 53 having a cylindrical rim portion 54 of maximum diameter and smaller diameter than the collar 43, and an adjacent intermediate tapered portion 55 of decreasing diameter and an outer cylindrical axial portion 56, this cam being suitably fixed on the threaded portion 52 by a lock nut 57. Herein the pulley 21 is also suitably fixed on the protruding end 37a of each member 30 and this pulley carries a pair of oppositely located latches 58 pivoted at 59 and movable in radial slots 60 in the pulley and having latch portions 61 provided with short parallel latch portions 62 and adjacent longer inclined portions 63 inclined toward one another and adapted to engage the tapered surface 55 on the member 53 in certain positions of the parts, as hereinafter described. Herein, these latch members are normally pressed inward by coiled springs 64 carried on the pulleys 21 and acting on the opposite side of the portions 61 from the latch engaging portions 62 and 63.

Cooperating with this controlling mechanism is also the improved controlling mechanism 29 carried on the arms 28 heretofore described. As shown, this last mentioned mechanism includes a sleeve 65 having one end 66 engageable with the end of the portion 52 and also having a plunger 67 movable therethrough and engageable with the end 51 of the rod 46 within the end of the sleeve 45. As shown, the plunger 67 also has a collar 68 therein normally projected by a coiled spring 69 acting between the latter and a nut 70 closing the end of a spring housing chamber 71 in the member 65. Herein, the latter member is also fixed in a suitable bushing 72 extending through the extremity of the arm 28, and the sleeve 65 has a collar 73 thereon surrounding the nut 70 and engageable with a suitable resilient abutment 74 such, for example, as rubber, suitably fixed to a bracket 75 also fixed to the arm 28.

In the operation of this improved construction, with the parts in the position shown in Figures 1, 2 and 6, the work gripping, rotating, and ejecting mechanisms 16 will obviously be inoperative during the normal operation of the stock feeding mechanism 2 and of the stock stops 3, while the transverse slide 4 will move its forming tools 5 in such manner as to form the stock, as shown in Figure 10 preparatory to a cutting off operation. Before the forming operation begins or shortly thereafter, however, the mechanisms 16 will be moved forward, i. e. away from the controlling mechanism 29, sufficiently to cause the projecting end of the stock to be received in the collet jaws 39 and, accordingly, to engage the adjacent end 50 of the rod 46 and move the latter freely rearwardly. However, when the end of the stock engages the adjacent end of the sleeve 45, the cam 53 on the latter swings the latch members 58 from the position shown in Figure 6 in such manner as to release the coiled spring 44 which, in turn, projects the sleeve 42 rearwardly, in such manner as, through the rearward movement of the collet jaws 39, to cause the same to grip the work, the parts then assuming the position shown in Figure 7. This grip of the collet jaws 39 upon the work thus occurs while these jaws and the entire mechanism 16 are rotating synchronously with the stock and the spindles 1. Further, this rotation continues and the carriage 10 continues in its forward position throughout the remainder of the operation of the forming tools 5 and also throughout the operation of the cutting off tools 7, the mechanism 16 preferably continuing to be in this forward position wherein it is spaced longitudinally from the mechanism 29, while the tools 5 and 7 successively assume the positions shown in Figures 10 and 11. Thus, not only is the work held firmly in position during the forming operation, but it continues to be so held and to be rotated with the stock at the same speed as the latter throughout the operation of the cutting off tool 7, so that the latter may move past the center of the stock in such manner as thereby to insure the elimination of any burr, since the work piece 8 being supported in the collet jaws 39, hence cannot drop and form a burr as heretofore. After the cutting off operation has been completed, the mechanism 16 begins its rearward or retractive movement with the carriage 10, the mechanism 16 then retaining the position shown in Figure 7 and moving toward the position shown in Figure 5. When, however, the end 51 of the ejector rod 46 engages the projecting end of the spring plunger 67, as shown in Figure 5, the plunger 67 is forced backward in such manner as to compress its spring 69. Further, as the mechanism 16 continues to move rearwardly, the protruding end 52 of the sleeve 45 strikes the protruding end 66 of the sleeve 65 which provides an abutment preventing further rearward movement of the sleeve 45 which, in turn, prevents further rearward movement of the sleeve 42 and consequently causes the coiled spring 44 to be compressed between collar 43 and the end wall of annular groove 37. The collet jaws 39 will be opened as soon as the member 30 has moved to the right relative to the fixed collet and its attached sleeve 42 sufficiently from the position shown in Figure 5 to release the work, while as soon as these jaws open, the spring 69 then being released, the plunger 67 will be also projected to the left against the end 51 of the ejector rod 46 in such manner as thereby to kick the work piece 8 out of the open collet jaws. However, as a result of this continued rearward movement of the member 30, the latches 58 will also be carried rearwardly from the position shown in Figure 5 in such manner that their springs 64 will force them inwardly into the position shown in Figure 6 wherein their parallel surfaces 62 engage the surfaces 54 on the cam 53. Here it will also be understood that in the next forward operation of the mechanism 16 on the carriage 10, as soon as this mechanism moves forwardly sufficiently to move the extremity 52 out of contact with the extremity 66 of the sleeve 65, the adjacent faces of the latches 58 will engage the collar 43 to hold the collet jaws 39 releasably in their forward position against the pressure of spring 44 in such manner as thus to permit the collet jaws 39 to remain in their open position ready to receive the next piece, the end 51 of the ejector rod 46 then projecting ready to begin a new cycle.

As a result of this improved construction, it is made possible to adapt a two-at-a-time machine of usual construction to the intended new uses, with a minimum of expense, the additional mechanism being carried on the longitudinally reciprocable carrier 10 and the outer tubular shaft 24. Further, it will be apparent that the work gripping, rotating, and ejecting mechanism 16 is thus adapted to cooperate in the proper timed relation with the other mechanisms of a standard machine and with the mechanism 29, the work being gripped when desired and ejected after the cutting off operations, without in any way delaying the operation of these other mechanisms and while eliminating the additional handling and grinding off of the pieces, heretofore required, in such manner as not only materially to reduce the labor required, but also to reduce the cost of production. These and other advantages of the improvements will, however, be clearly apparent to those skilled in the art.

While one form of this invention has been illustrated herein, it will be understood that the same has been shown for purposes of illustration, and that the invention may be modified and embodied in other forms without departing from its spirit or the scope of the appended claims.

What is claimed as new and desired to be secured by Letters Patent is:

1. In a work gripping and rotating mechanism, a constantly rotating reciprocable collet carrier, a collet thereon for gripping and releasing the work in different operative positions of said collet, and mechanism for controlling the operation of said collet including means biasing said collet into one operative position and latch means for holding the collet against said biasing means to maintain said collet in the other operative position.

2. In a work gripping and rotating mechanism, collet mechanism including a constantly rotatable reciprocable collet carrier, a collet thereon for gripping and releasing the work in different operative positions of said collet, means biasing the collet to one operative position thereof, and mechanism controlling the action of said collet including latch means normally maintaining the collet against movement into said operative position by said biasing means, and means controlled by the work received in said collet for releasing said latch means.

3. In a work gripping and rotating mechanism, collet mechanism including a constantly rotating reciprocable collet carrier, a normally open collet biased to work gripping position therein, and mechanism controlling the work gripping action of said collet including latch means on said carrier normally holding said collet against its bias and means controlled by the work received in said collet for releasing said latch means.

4. In a work gripping and rotating mechanism, collet mechanism including a constantly rotating reciprocable collet carrier, a normally open collet biased to work gripping position therein, and mechanism controlling the work gripping action of said collet including latch means on said carrier normally holding said collet against its bias and a reciprocable cam carrying member actuated by work received in said collet for releasing said latch means.

5. In a work gripping and rotating mechanism, collet mechanism including a constantly rotating reciprocable collet carrier, a collet biased to work gripping position therein, and mechanism controlling the work gripping action of said collet including latch means on said carrier for normally holding said collet against its bias, a reciprocable cam carrying member actuated by work received in said collet for releasing said latch means, and an abutment engageable by said cam carrying member for limiting the longitudinal movement of said cam carrying member in one direction upon reciprocation of said carrier.

6. In a work gripping and rotating mechanism, collet mechanism including a constantly rotating reciprocable collet carrier, a normally open collet biased to work gripping position therein, mechanism controlling the work gripping action of said collet including latch means on said carrier normally holding said collet against its bias, and ejector mechanism controlled by said latch means.

7. In a work gripping and rotating mechanism, collet mechanism including a constantly rotating reciprocable collet carrier, a collet rotatable therewith and reciprocable relative thereto and having spring means biasing said collet to work gripping position and acting between said carrier and said collet, and means controlling the operation of said collet including an abutment on said collet, a latch controlling member extending through said collet and actuated by a work piece therein, a cam on said controlling member adjacent said abutment, latch mechanism rotating with said carrier and cooperating with said abutment and cam, and a stationary abutment engageable by said latch controlling member and controlling said latch mechanism.

8. In a work gripping and rotating mechanism, collet mechanism including a constantly rotating reciprocable collet carrier, a collet rotatable therewith and reciprocable relative thereto and having spring means biasing said collet to work gripping position and acting between said carrier and said collet, and means controlling the operation of said collet including an abutment on said collet, a latch controlling member extending through said collet and actuated by a work piece therein, a cam on said controlling member adjacent said abutment, latch mechanism rotating with said carrier and cooperating with said abutment and cam, a stationary abutment engageable by said latch controlling member and controlling said latch mechanism, and ejector mechanism including an ejector member extending axially through said latch controlling member and reciprocable therewith and engageable with the work, and spring pressed ejector means carried by said stationary abutment and acting on said ejector member and controlled by said latch mechanism.

9. In a work gripping and rotating mechanism, collet mechanism including a constantly rotating reciprocable collet carrier, a collet rotatable therewith and reciprocable relative thereto and having spring means biasing said collet to work gripping position and acting between said carrier and said collet, and means controlling the operation of said collet including an abutment on said collet, a latch controlling member extending through said collet and actuated by a work piece therein, a cam on said controlling member adjacent said abutment, latch mechanism rotating with said carrier and cooperating with said abutment and cam, a stationary abutment engageable by said latch controlling member and controlling said latch mechanism, said latch mechanism comprising a spring pressed latch member holding said cam and said first mentioned abutment against relative longitudinal movement in the work engaging position of the collet and releasable when said cam strikes said second mentioned abutment to effect said relative longitudinal movement to release the work piece.

10. In a work gripping and rotating mechanism, collet mechanism including a constantly rotating reciprocable collet carrier, a collet rotatable therewith and reciprocable relative thereto and having spring means biasing said collet to work gripping position and acting between said carrier and said collet, and means controlling the operation of said collet including an abutment on said collet, a latch controlling member extending through said collet and actuated by a work piece therein, a cam on said controlling member adjacent said abutment, latch mechanism rotating with said carrier and cooperating with said abutment and cam, a stationary abutment engageable by said latch controlling member and controlling said latch mechanism, said latch mechanism comprising a spring pressed latch member cooperating with said abutment to maintain the collet in open position as said carrier and collet move toward the work and said latch member being released by said cam when said latch controlling member engages the work to release said abutment and permit the spring to effect relative reciprocation between the carrier and the collet to close the latter.

11. In a work gripping and rotating mechanism, collet mechanism including a constantly rotating reciprocable collet carrier, a collet rotatable therewith and reciprocable relative thereto and having spring means biasing said collet to work gripping position and acting between said carrier and said collet, and means controlling the operation of said collet including an abutment on said collet, a latch controlling member extending through said collet and actuated by a work piece therein, a cam on said controlling member adjacent said abutment, latch mechanism rotating with said carrier and cooperating with said abutment and cam, a stationary abutment engageable by said latch controlling member and controlling said latch mechanism, said latch mechanism comprising a spring pressed latch member holding said cam and said first mentioned abutment against relative longitudinal movement in the work engaging position of the collet and releasable when said cam strikes said second mentioned abutment to effect said relative longitudinal movement to release the work piece, and ejector mechanism including an ejector member reciprocable axially in said latch controlling member and a cooperating spring pressed plunger in said stationary abutment acting upon said ejector member to discharge the work piece from the collet when the latter releases the piece.

12. In a work gripping and rotating mechanism, collet mechanism including a constantly rotating reciprocable collet carrier, a collet rotatable therewith and reciprocable relative thereto and having spring means biasing said collet to work gripping position and acting between said carrier and said collet, and means controlling the operation of said collet including an abutment on said collet, a latch controlling member extending through said collet and actuated by a work piece therein, a cam on said controlling member adjacent said abutment, latch mechanism rotating with said carrier and cooperating with said abutment and cam, and a stationary abutment engageable by said latch controlling member and controlling said latch mechanism, said latch mechanism comprising pivoted oppositely located latch members having latching portions controlled by said cam member.

13. In a work gripping and rotating mechanism, collet mechanism including a constantly rotating reciprocable collet carrier, a collet rotatable therewith and reciprocable relative thereto and having spring means biasing said collet to work gripping position and acting between said carrier and said collet, and means controlling the operation of said collet including an abutment on said collet, a latch controlling member extending through said collet and actuated by a work piece therein, a cam on said controlling member adjacent said abutment, latch mechanism rotating with said carrier and cooperating with said abutment and cam, and a stationary abutment engageable by said latch controlling member and controlling said latch mechanism, said latch mechanism having latching portions one of which in the open position of the collet engages said cam while the other engages said first mentioned abutment to maintain the collet open during movement of said collet toward the work.

14. In a work gripping and rotating mechanism, collet mechanism including a constantly rotating reciprocable collet carrier, a collet rotatable therewith and reciprocable relative thereto and having spring means biasing said collet to work gripping position and acting between said carrier and said collet, and means controlling the operation of said collet including an abutment on said collet, a latch controlling member extending through said collet and actuated by a work piece therein, a cam on said controlling member adjacent said abutment, latch mechanism rotating with said carrier and cooperating with said abutment and cam, and a stationary abutment engageable by said latch controlling member and controlling said latch mechanism, said latch mechanism having a latching portion holding said first mentioned abutment against movement relative to said carrier as the collet approaches the work, and said latch mechanism being movable by said cam when the work engages said latch controlling member to release said abutment and permit sufficient relative movement between the carrier and the collet to effect gripping of the work.

15. In a machine tool having parallel work rotating spindles, transversely movable forming and cutting off mechanisms operating on work therein, and driving shafting for said mechanisms and spindles extending parallel to said spindles between the same, a carrier reciprocable longitudinally toward and from the work in said spindles in timed relation to said forming and cutting off mechanisms, and work gripping and rotating mechanisms mounted on said carrier and on opposite sides of said shafting including a constantly rotating work gripping mechanism for each spindle rotatable at the same speed as said spindles.

16. In a machine tool having parallel work rotating spindles, transversely movable forming and cutting off mechanisms operating on work therein, and driving shafting for said mechanisms and spindles extending parallel to said spindles between the same, a carrier reciprocable longitudinally toward and from the work in said spindles in timed relation to said forming and cutting off mechanisms, work gripping and rotating mechanisms mounted on said carrier and on opposite sides of said shafting including a rotatable work gripping mechanism for each spindle, and a constantly operating motor carried on said carrier and having driving connections constantly rotating said work gripping mechanisms at the same speed as said spindles.

17. In a machine tool having parallel work rotating spindles, transversely movable forming and cutting off mechanisms operating on work therein, and driving shafting for said mechanisms and spindles extending parallel to said spindles between the same, a carrier reciprocable longitudinally toward and from the work in said spindles in timed relation to said forming and cutting off mechanisms, and work gripping and rotating mechanisms mounted on said carrier and on opposite sides of said shafting including a constantly rotating work gripping mechanism for each spindle rotatable at the same speed as said spindles, and automatic mechanism controlled by the reciprocation of said carrier for actuating said gripping mechanisms to grip and rotate the work during the cutting off operation and to eject the work as the carrier is retracted.

18. In a machine tool having parallel work rotating spindles, transversely movable forming and cutting off mechanisms operating on work therein, driving shafting for said mechanisms and spindles extending parallel to said spindles between the same, a carrier reciprocable longitudinally toward and from the work in said spindles in timed relation to said forming and cutting off mechanisms, stock stop mechanism actuated by said carrier, work gripping and rotating mechanisms mounted on said carrier and on opposite sides of said shafting including a constantly rotating work gripping mechanism for each spindle rotatable at the same speed as said spindle, and automatic mechanism controlled by the reciprocation of said carrier for actuating said gripping mechanisms to grip and rotate the work during the cutting off operation and to eject the work as the carrier is retracted including abutments movable with said stock stop mechanism.

19. In a machine tool having parallel work rotating spindles, transversely movable forming and cutting off mechanisms operating on work therein, driving shafting for said mechanisms and spindles extending parallel to said spindles between the same, a carrier reciprocable longitudinally toward and from the work in said spindles in timed relation to said forming and cutting off mechanisms, stock stop mechanism actuated by said carrier, work gripping and rotating mechanisms mounted on said carrier and on opposite sides of said shafting including a constantly rotating work gripping mechanism for each spindle rotatable at the same speed as said spindle, and automatic mechanism controlled by the reciprocation of said carrier for actuating said gripping mechanisms to grip and rotate the work during the cutting off operation and to eject the work as the carrier is retracted including abutments movable with said stock stop mechanism, and ejector mechanism including ejector members carried by said work gripping mechanisms and actuating mechanism for said ejector members carried by said abutments.

20. An attachment for machine tools comprising a longitudinally reciprocable carrier, upstanding supports on opposite sides thereof providing a passage therebetween for actuating shafting, work gripping mechanisms journalled in said supports, a motor having a support carried on said supports and disposed above said work gripping mechanisms and the shafting passage therebetween, and driving connections between said motor and said work gripping mechanisms.

21. An attachment for machine tools comprising a longitudinally reciprocable carrier, upstanding supports on opposite sides thereof providing a passage therebetween for actuating shafting, work gripping mechanisms journalled in said supports, a motor having a support carried on said supports and disposed above said work gripping mechanisms and the shafting passage therebetween and having its axis parallel to said passage, and driving connections between said motor and said work gripping mechanisms including pulleys on said motor and work gripping mechanisms, a belt connecting said pulleys, and an adjustable pulley carried on the motor support below the latter for adjusting the tension of said belt.

RAYMOND L. KUEHN.